US008448323B2

(12) United States Patent
Leckman et al.

(10) Patent No.: US 8,448,323 B2
(45) Date of Patent: May 28, 2013

(54) METHOD FOR MODERNIZING AN ELEVATOR

(75) Inventors: Randy Leckman, McKinney, TX (US); Håkan Bärneman, Solna (SE); Iain Kinner, Flower Mound, TX (US)

(73) Assignee: Kone Corporation, Helsinki (FI)

( * ) Notice: Subject to any disclaimer, the term of this patent is extended or adjusted under 35 U.S.C. 154(b) by 213 days.

(21) Appl. No.: 13/024,930

(22) Filed: Feb. 10, 2011

(65) Prior Publication Data

US 2012/0090144 A1 Apr. 19, 2012

Related U.S. Application Data

(60) Provisional application No. 61/393,501, filed on Oct. 15, 2010.

(51) Int. Cl.

| | |
|---|---|
| ***B23P 6/00*** | (2006.01) |
| ***B60P 3/42*** | (2006.01) |
| *B66B 9/02* | (2006.01) |
| *B66B 11/04* | (2006.01) |

(52) U.S. Cl.

USPC .................. 29/402.08; 29/402.03; 29/402.09; 29/401.1; 187/250; 187/251

(58) Field of Classification Search

USPC ................. 29/402.03, 402.08, 402.09, 401.1, 29/402.01; 187/249, 250, 251, 266, 406, 187/411

See application file for complete search history.

(56) References Cited

U.S. PATENT DOCUMENTS

| | | | | |
|---|---|---|---|---|
| 5,429,211 | A * | 7/1995 | Aulanko et al. | 187/254 |
| 5,833,031 | A * | 11/1998 | Liebetrau et al. | 187/239 |
| 7,467,691 | B2 * | 12/2008 | Deplazes et al. | 187/249 |
| 7,481,300 | B2 * | 1/2009 | Aulanko et al. | 187/266 |
| 7,753,174 | B2 * | 7/2010 | Reuter | 187/249 |
| 7,802,658 | B2 * | 9/2010 | Aulanko et al. | 187/266 |
| 7,828,120 | B2 * | 11/2010 | Kocher et al. | 187/249 |
| 8,118,138 | B2 * | 2/2012 | Aulanko et al. | 187/264 |
| 8,141,684 | B2 * | 3/2012 | Bjorni et al. | 187/264 |
| 8,205,720 | B2 * | 6/2012 | Barneman | 187/266 |
| 2002/0185338 | A1 * | 12/2002 | Bauer | 187/254 |
| 2003/0159891 | A1 * | 8/2003 | Ach et al. | 187/266 |

(Continued)

FOREIGN PATENT DOCUMENTS

| | | |
|---|---|---|
| JP | 1-181689 A | 7/1989 |
| JP | 3-61276 A | 3/1991 |
| JP | 3-120186 A | 5/1991 |
| JP | 4-16478 A | 1/1992 |

(Continued)

*Primary Examiner* — Essama Omgba

(74) *Attorney, Agent, or Firm* — Birch, Stewart, Kolasch & Birch, LLP

(57) ABSTRACT

A method for modernizing an elevator includes arranging a first rope clamp and a second rope clamp such that the first rope clamp and the second rope clamp are supported by a same support element; removing the old hoisting roping; and installing a new hoisting roping by guiding the new hoisting roping to pass from the traction sheave to the elevator car or the counterweight via the aperture in the floor of the machine room, the new hoisting roping comprising a first part that is guided to pass to the elevator car or the counterweight to a first diverting pulley, and onwards from the first diverting pulley back upwards to the first rope clamp; and a second part that is guided to pass to the elevator car or the counterweight to a second diverting pulley, and onwards from the second diverting pulley back upwards to the second rope clamp.

27 Claims, 6 Drawing Sheets

U.S. PATENT DOCUMENTS

| | | | | |
|---|---|---|---|---|
| 2004/0007428 | A1* | 1/2004 | Teramoto et al. | 187/249 |
| 2004/0035645 | A1* | 2/2004 | Orrmann | 187/266 |
| 2004/0256179 | A1* | 12/2004 | Deplazes et al. | 187/249 |
| 2005/0217944 | A1* | 10/2005 | Aulanko et al. | 187/266 |
| 2007/0227832 | A1* | 10/2007 | Aulanko et al. | 187/406 |
| 2008/0023271 | A1* | 1/2008 | Kocher et al. | 187/247 |
| 2011/0278098 | A1* | 11/2011 | Ketonen et al. | 187/266 |
| 2012/0160615 | A1* | 6/2012 | Girgis et al. | 187/411 |
| 2012/0267203 | A1* | 10/2012 | Friedli et al. | 187/388 |
| 2012/0318615 | A1* | 12/2012 | Aulanko et al. | 187/254 |

FOREIGN PATENT DOCUMENTS

| | | | | |
|---|---|---|---|---|
| JP | 4-125282 | A | | 4/1992 |
| JP | 06171860 | A | * | 6/1994 |
| JP | 2002-205886 | A | | 7/2002 |
| JP | 2005-82308 | A | | 3/2005 |
| JP | 2005-138917 | A | | 6/2005 |
| WO | WO 2005/00728 | A1 | | 1/2005 |
| WO | WO 2005000729 | A1 | * | 1/2005 |
| WO | WO 2008071831 | A1 | * | 6/2008 |

* cited by examiner

METHOD FOR MODERNIZING AN ELEVATOR

CROSS-REFERENCE TO RELATED APPLICATIONS

This nonprovisional application claims priority under 35 U.S.C. §119(e) on U.S. Provisional Application No. 61/393,501, filed on Oct. 15, 2010, the entirety of which is incorporated herein by reference.

BACKGROUND OF THE INVENTION

1. Field of the Invention

The object of the invention is a method for modernizing an elevator, which elevator is preferably an elevator applicable to the transporting of passengers and/or of freight.

2. Description of Background Art

The original old elevators in old buildings are conventionally often traction sheave elevators provided with counterweights, in which the suspension ratio is normally 1:1, and which comprise a geared hoisting machine that is disposed in a machine room above the elevator hoistway. When old elevators are modernized, the parts of them are replaced for new ones and possibly the rope suspension is changed. The hoisting machine is generally changed for a gearless one, because a gearless machine is cheaper and smaller in size than a geared machine. When a new gearless hoisting machine is installed into an old elevator, also a 1:1 suspension ratio must generally be changed to a 2:1 suspension ratio. In this case, a problem arises from the need to pierce new rope apertures in the floor of the machine room, because a 2:1 suspension needs rope apertures in different places than a 1:1 suspension. Piercing new rope apertures is per se easy, but if this is done the strength of the machine room floor weakens owing to the rather large new rope apertures needed for many parallel ropes. In this case the strength of the floor does not necessarily meet the required safety criteria. In the worst case, the floor of the machine room will no longer endure the weight of the hoisting machine and of the other parts in the machine room, in which case the floor will collapse, which results at least in physical damage and possibly also in personal injury. Owing to this safety risk, it is usually necessary in connection with a change in the suspension ratio to support the hoisting machine on the walls of the elevator hoistway e.g. with steel beams fitted under the floor of the machine room. That being the case, a change in the suspension ratio is in practice generally expensive and is a large operation, and in many cases is rather difficult to implement. One solution presented in publication FI20070994 is that the ropes that ascend from the elevator car are led into the machine room via small holes formed for them. In this solution also holes are made in the floor of the machine room. Likewise in the solution the fixing and positioning of the rope clamps into their positions in relation to each other is not always fast. The placement of the rope clamps into their position one at a time so that they are correctly positioned in relation to each other can be awkward particularly because determining the correct position of the ropes while working in the top part of the elevator hoistway is not easy and, on the other hand, it is difficult to see to the hoistway side from the machine room.

SUMMARY OF THE INVENTION

The aim of the invention is to eliminate the aforementioned drawbacks, among others, of prior-art solutions. More particularly the aim of the invention is to produce a simple and inexpensive method that saves time and money, with which method when modernizing an elevator the strength of the floor of the machine room does not essentially weaken when the suspension ratio is changed. With the invention also simple and fast fixing of the clamps, in relation to each other, of the hoisting ropes in connection with installation is achieved.

In a basic embodiment of the concept according to the invention, in the method for modernizing an elevator, wherein the suspension of the old elevator is modified, which old elevator comprises an elevator car, a counterweight, an elevator hoistway, a hoisting machine with traction sheave in a machine room above the elevator hoistway, for moving the elevator car in the elevator hoistway via the hoisting roping, the old hoisting roping, which comprises one or more hoisting ropes, which passes around the aforementioned traction sheave and connects the aforementioned elevator car and the counterweight, in which old elevator the old hoisting roping passes from the traction sheave to the elevator car, to a rope clamp that is in connection with the elevator car, via an aperture in the floor of the machine room (and to a rope clamp in connection with the counterweight via an aperture in the floor of the machine room), and in which method the following phases are performed:

- a first rope clamp and a second rope clamp are arranged in the top part of the elevator hoistway such that they are supported by a same support element that is supported in its position,
- the old hoisting roping is removed,
- the new hoisting roping is installed, which new hoisting roping is guided to pass around the traction sheave and to connect the elevator car and the counterweight, and which new hoisting roping is guided to pass from the traction sheave to the elevator car via an aperture in the floor of the machine room, which new hoisting roping comprises a plurality of ropes, of which plurality a first part is guided to pass to the elevator car to a first diverting pulley that is in connection with the elevator car, and onwards from the first diverting pulley back upwards to a first rope clamp in the top part of the elevator hoistway, and of which plurality a second part is guided to pass to the elevator car to a second diverting pulley that is in connection with the elevator car, and onwards from the second diverting pulley back upwards to a second rope clamp in the top part of the elevator hoistway.

In this way the aforementioned advantages are achieved. The fixing and positioning of the ropes can be achieved quickly and simply. Furthermore, the main suspension of the elevator car is easy to arrange.

In a second basic embodiment of the concept according to the invention, in the method for modernizing an elevator the suspension of the old elevator is modified, which old elevator comprises, an elevator car, a counterweight, an elevator hoistway, a hoisting machine with traction sheave in a machine room above the elevator hoistway, for moving the elevator car in the elevator hoistway via the hoisting roping, the old hoisting roping, which comprises one or more hoisting ropes, which passes around the aforementioned traction sheave and connects the aforementioned elevator car and the counterweight, in which old elevator the old hoisting roping passes from the traction sheave to the counterweight, to a rope clamp that is in connection with the counterweight, via an aperture in the floor of the machine room, and in which method the following phases are performed a third rope clamp and a fourth rope clamp are arranged in the top part of the elevator hoistway such that they are supported by a same support element that is supported in its position, the old hoisting roping is removed, the new hoisting roping is installed, which new hoisting roping is guided to pass around the traction sheave and to connect the elevator car and the counterweight, and which new hoisting roping is guided to pass from the traction sheave to the counterweight via an aperture in the floor of the machine room (5), which new hoisting roping comprises a plurality of ropes, of which plurality a first part is guided to pass to the counterweight to a third diverting pulley that is in connection with the counterweight, and onwards from the third diverting pulley back upwards to a third rope clamp in the top part of the elevator hoistway, and of which plurality a second part is guided to pass to the counterweight to a fourth diverting pulley that is in connection with the counterweight, and onwards from the fourth diverting pulley back upwards to a fourth rope clamp in the top part of the elevator hoistway.

In this way the aforementioned advantages are achieved. The fixing and positioning of the ropes can be achieved quickly and simply. Furthermore the main suspension of the counterweight is easy to arrange.

In a more refined embodiment of the invention the number of ropes of the first part of the hoisting roping that are side-by-side on the first diverting pulley is essentially as great as the number of ropes of the second part of the hoisting roping that are side-by-side on the second diverting pulley, and that the combined number of ropes of the rope parts is the same as the number of hoisting ropes of the hoisting roping that are side-by-side on the traction sheave.

In a more refined embodiment of the invention the first part and the second part arriving at the diverting pulleys from the traction sheave are at a first distance from each other, and the first part is guided when it passes under the first diverting pulley to bend in a first direction and the second part is guided when it passes under the second diverting pulley to bend in a second direction such that the first part and the second part that leave the diverting pulleys upwards are at a second distance from each other that is essentially greater than the first distance. The aforementioned first and second bending direction are essentially opposite directions. Thus they can be space-efficiently guided to the rope clamps. Likewise the main suspension can be simply achieved despite the addition of diverting pulleys.

In a more refined embodiment of the invention the number of ropes of the first part of the hoisting roping that are side-by-side on the third diverting pulley is essentially as great as the number of ropes of the second part of the hoisting roping that are side-by-side on the fourth diverting pulley, and that the combined number of ropes and of rope parts is the same as the number of hoisting ropes of the hoisting roping that are side-by-side on the traction sheave.

In a more refined embodiment of the invention the first part and the second part arriving at the diverting pulleys from the traction sheave are at a first distance from each other, and the first part is guided when it passes under the third diverting pulley to bend in a first direction and the second part is guided when it passes under the fourth diverting pulley to bend in a second direction such that the first part and the second part that leave the diverting pulleys upwards are at a second distance from each other that is essentially greater than the first distance. The aforementioned first and second bending direction are essentially opposite directions. Thus they can be space-efficiently guided to the rope clamps. Likewise the main suspension to the counterweight can be simply and compactly achieved despite the addition of diverting pulleys.

In a more refined embodiment of the invention in the method the new hoisting roping is guided to pass from the traction sheave to the elevator car via an aperture in the floor of the machine room, which aperture is at least essentially the same aperture via which the old hoisting roping passed from the traction sheave to the elevator car.

In a more refined embodiment of the invention in the method the new hoisting roping is guided to pass from the traction sheave to the counterweight via an aperture in the floor of the machine room, which aperture is at least essentially the same aperture via which the old hoisting roping passed from the traction sheave to the counterweight.

In a more refined embodiment of the invention in the method the first and the second rope clamp in the top part of the elevator hoistway are arranged to take vertical support force from the top surface of the floor of the machine room or from a structure that is on top of the floor by means of the aforementioned (same) support element that extends through the floor.

In a more refined embodiment of the invention in the method a phase wherein the aforementioned support element is installed into its position is performed.

In a more refined embodiment of the invention in the method a phase wherein diverting pulleys are installed in connection with the elevator car and with the counterweight is performed.

In a more refined embodiment of the invention the aforementioned rope damps are fixed in their aforementioned support element.

In a more refined embodiment of the invention the aforementioned support element extends through the floor via the same aperture via which the new hoisting roping passes to the elevator car.

In a more refined embodiment of the invention the third and the fourth rope clamp in the top part of the elevator hoistway are arranged to take vertical support force from the top surface of the floor of the machine room or from a structure that is on top of the floor by means of a support element that extends through the floor.

In a more refined embodiment of the invention the rope clamps are in their entirety below the floor of the machine room and there is no aperture in the floor at the point of said clamps.

In a more refined embodiment of the invention the aforementioned support element extends through the floor via the same aperture via which the new hoisting roping passes to the counterweight.

In a more refined embodiment of the invention the aforementioned support element (30) is fixed to the aforementioned structure that is on top of the floor.

In a more refined embodiment of the invention the aforementioned support element extends onto the top surface of the floor or of the aforementioned structure that is on top of the floor, from where the support element takes vertical support force.

In a more refined embodiment of the invention the aforementioned structure on top of the floor is a machine bedplate.

In a more refined embodiment of the invention the rope clamps that are supported on the aforementioned support element that is supported in its position are at a horizontal distance from each other, which horizontal distance is greater than the width of the aforementioned aperture in the direction of the aforementioned horizontal distance.

In a more refined embodiment of the invention the rope clamps that are supported on the aforementioned support element that is supported in its position are at a horizontal distance from each other, which horizontal distance is essentially greater than the width of the rope mat to be lowered from the traction sheave (8).

In a more refined embodiment of the invention the aforementioned support element comprises a part that extends through the floor from the elevator hoistway, and on the elevator hoistway side a part of the aforementioned part that protrudes to a first side, on which the first rope clamp is disposed, and a part that protrudes to a second side, on which the second rope clamp is disposed such that the first and the second rope clamp are at a horizontal distance from each other.

In a more refined embodiment of the invention the aforementioned support element comprises a part that extends through the floor from the elevator hoistway, and on the machine room side parts (20*d*,30*d*) of the aforementioned part that protrude to a first side and to a second side, which parts extend over the top surface of the floor or of the structure supported against the floor.

In a more refined embodiment of the invention the aforementioned support element comprises a part that extends through the floor from the elevator hoistway, which part is preferably tubular or trough-shaped, and the new hoisting roping passes at least partly inside the aforementioned tubular or trough-shaped part.

In a more refined embodiment of the invention the support element is a horizontal beam that is below the floor of the machine room, i.e. below the machine room slab.

In a more refined embodiment of the invention the rope clamps are in connection with the support element when the support element is installed into its position in the elevator hoistway.

In a more refined embodiment of the invention fixing locations for the rope clamps are made in the support element before it is installed into its position, into which fixing locations the rope clamps are fixed after installation of the support element into its position, of which fixing locations the support element preferably comprises a plurality per each rope clamp, and preferably the distance between rope clamps is adjusted to be suitable, after which the rope clamps are fixed into the fixing locations at their points.

In a more refined embodiment of the invention each aforementioned rope clamp comprises a fixing location for one or more ropes.

In a more refined embodiment of the invention the support element is supported on the horizontal beams of the old elevator that are below the floor of the machine room, i.e. below the machine room slab.

In a more refined embodiment of the invention the support element is a horizontal beam that is below the floor of the machine room, i.e. below the machine room slab, which beam is fixed at its ends to the guide rails of the elevator car.

In a more refined embodiment of the invention the aforementioned diverting pulleys are at an angle with respect to each other.

Some inventive embodiments are also presented in the descriptive section and in the drawings of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. The features of the various embodiments can be applied within the framework of the basic inventive concept in conjunction with other embodiments. Each of the additional features mentioned by a preceding embodiment can also singly and separately from the other embodiments form a separate invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
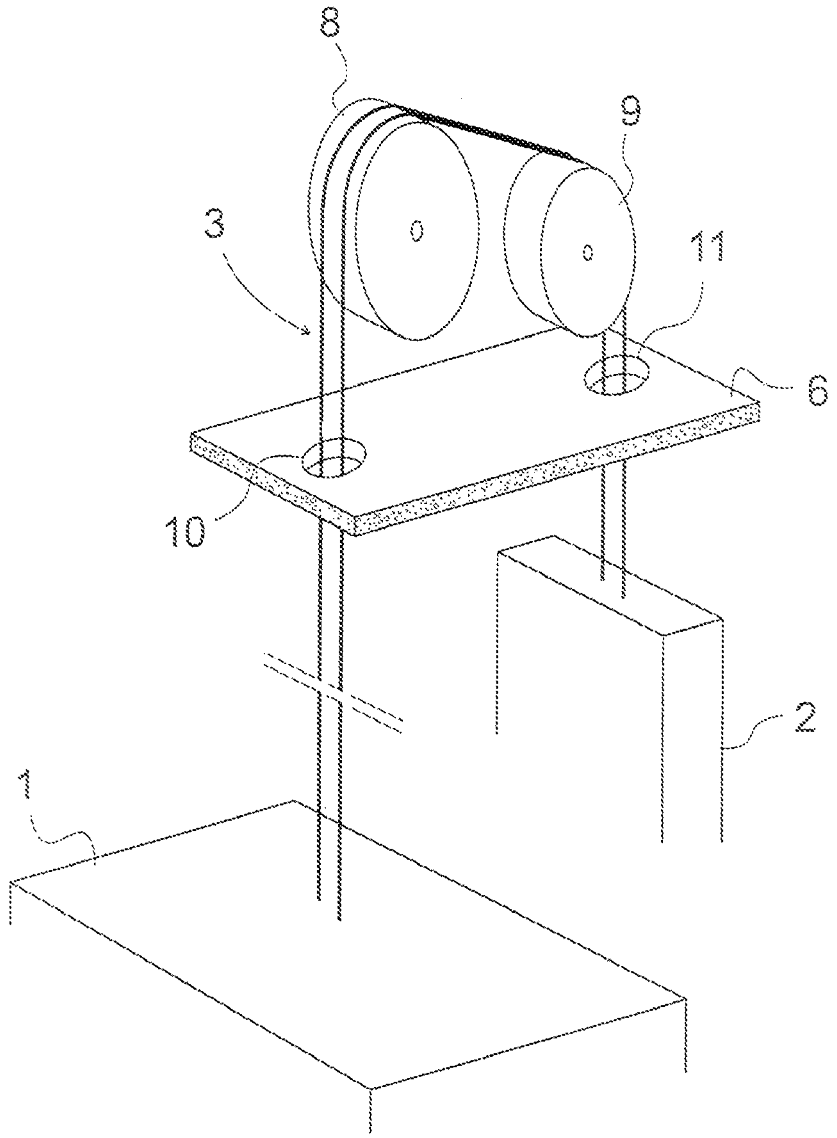
Fig. 1 (PRIOR ART)
FIG. 1 diagrammatically presents a prior-art elevator before modernization with the method according to the invention.

FIG. 1 presents an old elevator, i.e. an elevator that is already in service, before modernization with the method according to the invention. The old elevator comprises an elevator car 1, a counterweight 2, an elevator hoistway S, a machine room 5 above the elevator hoistway S, which machine room 5 contains a hoisting machine with traction sheave on top of its floor. The hoisting machine comprises a machinery bedplate supporting the traction sheave, a power source, such as an electric motor, and a control, which are not presented in all the figures for the sake of clarity. The hoisting machine is arranged to move the elevator car 1 (and the counterweight) in the elevator hoistway by means of the traction sheave 8 via the old hoisting roping 3, which old hoisting roping 3 comprises one or more hoisting ropes, which passes around the aforementioned traction sheave 8 and connects the aforementioned elevator car 1 and the counterweight 2. In the old elevator the old hoisting roping 3 passes from the traction sheave 8 to the elevator car 1, to a rope clamp that is in connection with the elevator car 1, to which the end of the hoisting roping 3 is fixed, via an aperture 10 in the floor 6 of the machine room 5, and to a rope clamp that is in connection with the counterweight 2, to which the end of the hoisting roping 3 is fixed, via an aperture 13 in the floor 6 of the machine room 5. The old elevator presented is an elevator having a 1:1 suspension. The hoisting machine also comprises a gear via which the motor is connected to the traction sheave 8, by means of which gear the speed of rotation (rpm) of the traction sheave is fitted to be smaller than the speed of rotation (rpm) of the motor.

Figure 2:
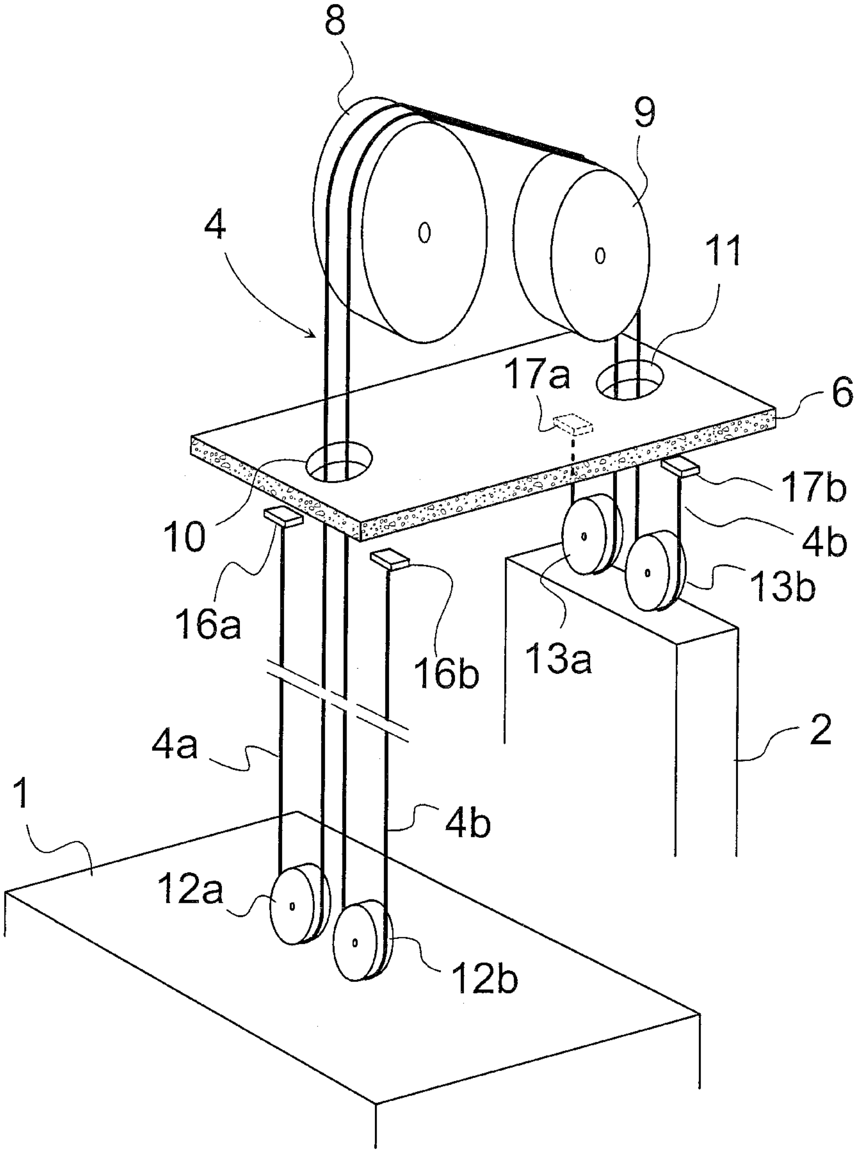
FIG. 2 diagrammatically presents the elevator of FIG. 1 when it has been modernized with the method according to the invention.
Figure 3:
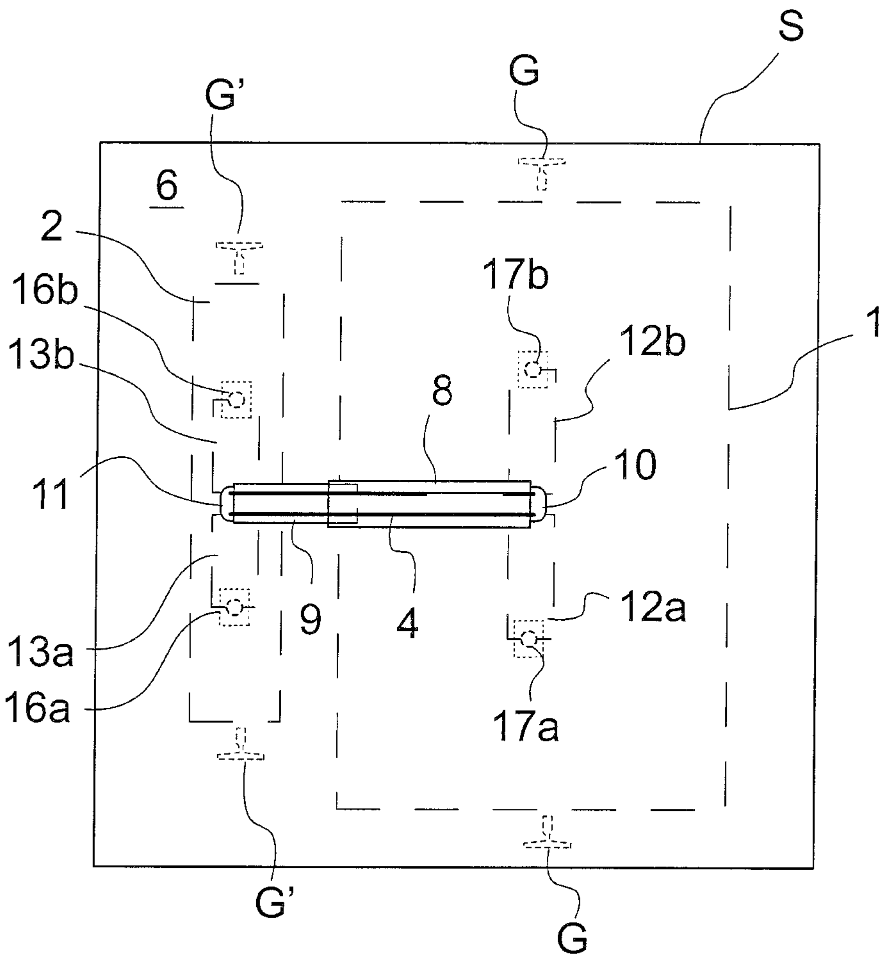
FIG. 3 presents the layout of the elevator of FIG. 2.

In the method according to the invention the elevator according to FIG. 1 is converted to be of the type presented in FIG. 2. A first, a second, a third and a fourth rope clamp (16*a*,16*b*,17*a*,17*b*) are arranged in the top part of the elevator hoistway S. The first rope clamp 16*a* and the second rope clamp 16*b* are arranged in the top part of the elevator hoistway S such that they are supported by a same support element (20,30,60 or 70) that is supported in its position with one of the methods presented in FIGS. 4-7. The third rope clamp 17*a* and the fourth rope clamp 17*b* are arranged in the top part of the elevator hoistway S such that they are supported by a same support element (20,30,60 or 70) that is supported in its position with one of the methods presented in FIGS. 4-7. The arranging of the rope clamps into their positions is performed preferably, but not necessarily, by working from the roof of the elevator car. Preferably the diverting pulleys are already in this stage also installed in connection with the elevator car and the counterweight. After this the old hoisting roping 3 is removed and the new hoisting roping 4 is installed, which new hoisting roping 4 is guided to pass around the traction sheave 8 and to connect the elevator car 1 and the counterweight 2, and which new hoisting roping 4 is guided to pass from the traction sheave 8 to the elevator car 1 via the aperture 10 in the floor 6 of the machine room 5, which aperture 10 is at least essentially the same aperture via which the old hoisting roping 3 passed from the traction sheave 8 to the elevator car 1. The new hoisting roping 4 comprises a plurality of ropes, of which plurality a first part 4*a* is guided to pass to the elevator car to a first diverting pulley 12*a* that is in connection with the elevator car, and onwards from the first diverting pulley 12*a* back upwards to a first rope clamp 16*a* in the top part of the elevator hoistway S, and of which plurality a second part 4*b* is guided to pass to the elevator car 1 to a second diverting pulley 12*b* that is in connection with the elevator car, and onwards from the second diverting pulley 12*b* back upwards to a second rope clamp 16*b* in the top part of the elevator hoistway S. Thus the section of hoisting roping on the first side of the traction sheave is led to the elevator car. The section of hoisting roping on the second side of the traction sheave is led to the counterweight. Thus the new hoisting roping 4 is guided to pass from the traction sheave 8 to the counterweight 2 via the aperture 11 in the floor 6 of the machine room 5, which aperture 11 is at least essentially the same aperture via which the old hoisting roping 3 passed from the traction sheave 8 to the counterweight 2. The new hoisting roping 4 comprises a plurality of ropes, of which plurality a first part is guided to pass from the traction sheave to the counterweight 2 to a third diverting pulley 13*a* that is in connection with the counterweight 2, and onwards from the third diverting pulley 13*a* back upwards to a third rope clamp 17*a* in the top part of the elevator hoistway 1, and of which plurality a second part is guided to pass to the counterweight 2 to a fourth diverting pulley 13*b* that is in connection with the counterweight, and onwards from the fourth diverting pulley 13*b* back upwards to a fourth rope clamp 17*b* in the top part of the elevator hoistway.

The hoisting roping 4 forming a rope mat against the traction sheave 8 is divided into two parts 4*a* and 4*b* that are essentially similar to each other and of the same magnitude as each other. For the sake of clarity, only one hosting rope for each part 4*a* and 4*b* of the hoisting roping 4 is drawn in the figures, but in reality there can be more ropes side-by-side, e.g. four parallel ropes on the traction sheave 8 and when divided two parallel ropes in each part 4*a* and 4*b* of the hoisting roping, in which case the hoisting rope 4 thus comprises in total four parallel hoisting ropes. The number of ropes of the first part 4*a* of the hoisting roping 4 that are side-by-side on the first diverting pulley 12*a*is essentially, or fully, as great as the number of ropes of the second part 4*b* of the hoisting roping 4 that are side-by-side on the second diverting pulley 12*b*, and the combined number of ropes of the rope parts 4*a* and 4*b* is the same as the number of hoisting ropes that are side-by-side on the traction sheave 8 of the hoisting roping 4.

The first part 4*a* and the second part 4*b* arriving at the diverting pulleys 12*a* and 12*b* from the traction sheave 8 are at a first distance from each other, and the first part 4*a* is guided when it passes under the first diverting pulley 12*a* to bend in a first direction and the second part 4*b* is guided when it passes under the second diverting pulley 12*b* to bend in a second direction such that the first part 4*a* and the second part 4*b* that leave the diverting pulleys 12*a* and 12*b* upwards are at a second distance from each other that is essentially greater than the first distance. The aforementioned first and second bending directions are essentially opposite directions. The first and the second diverting pulley are placed side-by-side and their shafts are parallel. They could, however, be placed at an angle, of preferably at most 90 degrees, in relation to each other in which case the rope coming from the traction sheave can more easily bypass the support element 60,70 of FIG. 6 or 7. It is advantageous to make a corresponding arrangement on the counterweight side.

With the arrangement described above, the at least essentially same old rope aperture 10,11 is utilized. The aperture is thus not essentially, or not at all, expanded, which means that the cross-sectional surface of the aperture is not expanded by more than 30%, more preferably not over 20%, preferably not over 10%, most preferably not at all. Thus the load-bearing capability of the load-bearing structures of the floor does not need to be weakened. The edges of the aperture 10, 11 can be tidied or edging strips or surface lining can be installed in it, but it does not essentially need to be expanded or does not need to be expanded at all.

The following embodiments, which refer to FIGS. 4-7, present a fixing with respect to the hoisting ropes on the elevator car side, but the ropes on the counterweight side can be fixed with a quite corresponding arrangement.

Figure 4:
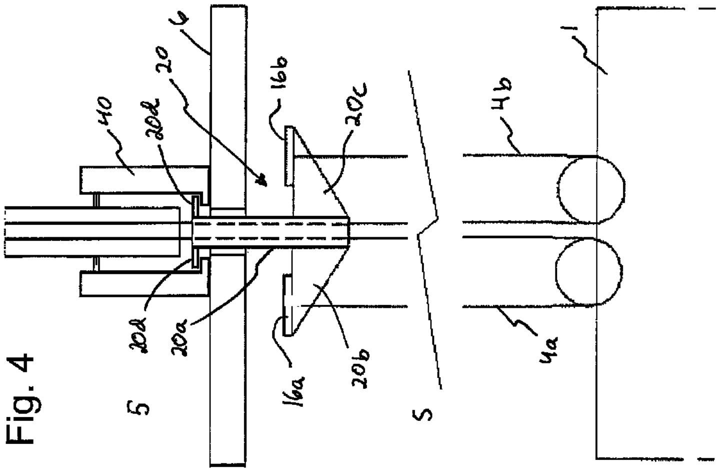
FIG. 4 presents a method to arrange the elevator according to FIG. 2 according to one preferred embodiment.

FIG. 4 presents one preferred method for arranging the rope clamps 16*a* and 16*b* to be supported on a same support element 20. In this case in the method a support element 20, on which the rope clamps 16*a* and 16*b* are already supported, is installed in the top part of the elevator hoistway. In the method the first and the second rope clamp 16*a*,16*b* in the top part of the elevator hoistway 1 are arranged to take vertical support force from the structure that is on top of the floor 6 of the machine room 5 by means of the support element 20 that extends through the floor 6. The aforementioned support element 20 extends through the floor 6 via the same aperture 10 via which the new hoisting roping 4 is led to pass from the traction sheave 8 to the elevator car 1. The aforementioned support element 20 is fixed with fixing means to the aforementioned structure 40 that is on top of the floor. The support element 20 preferably also extends over the top surface comprised in the aforementioned structure 40, from where the support element takes vertical support force. In this case the shearing forces can be reduced or possibly the need to use fixing means completely. The aforementioned structure on top of the floor 6 is preferably a machinery bedplate 40, i.e. a bed that supports at least the traction sheave 8 above the floor 6. Thus the distribution of forces onto the floor does not change considerably in connection with a modernization. To reach through the floor the aforementioned support element 20 comprises a part 20*a* that extends through the floor from the elevator hoistway, and on the elevator hoistway S side a part 20*b* of the aforementioned part that protrudes to a first side, on which the first rope clamp 16*a* is disposed, and a part 20*c* that protrudes to a second side, on which the second rope clamp is disposed such that the first and the second rope clamp 16*a*,16*b* are at a horizontal distance from each other. The aforementioned support element 20 also comprises on the machine room 5 side parts 20*d* of the aforementioned part 20*a* that protrude to a first side and to a second side, which parts extend over the top surface of the structure 40 supported against the floor 6. The part 20*a* that extends through the floor 6 is preferably tubular or trough-shaped, and the new hoisting roping 4 passes at least partly inside the aforementioned tubular or trough-shaped part.

Figure 5:
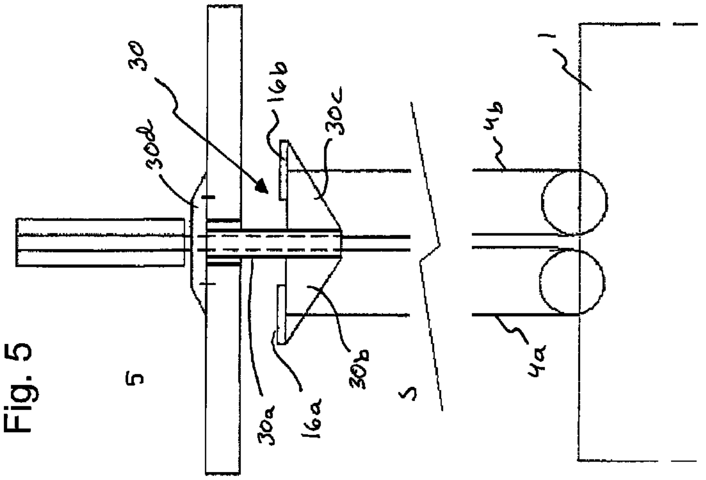
FIG. 5 presents a method to arrange the elevator according to FIG. 2 according to a second preferred embodiment.

FIG. 5 presents a second preferred method for arranging the rope clamps 16*a* and 16*b* to be supported on the same support element 30. In this case in the method the support element 30, on which the rope clamps 16*a* and 16*b* are already supported, is installed in the top part of the elevator hoistway. In the method the first and the second rope clamp 16*a*,16*b* in the top part of the elevator hoistway 1 are arranged to take vertical support force directly from the top surface of the floor 6 of the machine room 5 by means of the support element 30 that extends through the floor 6. The aforementioned support element 30 extends through the floor 6 via the same aperture 10 via which the new hoisting roping 4 is led to pass from the traction sheave 8 to the elevator car 1. The support element 30 extends to on top of the top surface of the floor, from where the support element takes vertical support force. To reach through the floor the aforementioned support element 30 comprises a part 30*a* that extends through the floor from the elevator hoistway, and on the elevator hoistway S side a part 30*b* of the aforementioned part 30*a* that protrudes to a first side, on which the first rope clamp 16*a* is disposed, and a part 30*c* that protrudes to a second side, on which the second rope clamp is disposed such that the first and the second rope clamp 16*a*,16*b* are at a horizontal distance from each other. The aforementioned support element 30 also comprises on the machine room 5 side parts 30*d* of the aforementioned part 30*a* that protrude to a first side and to a second side, which parts extend over the top surface of the floor 6. The part 20*a*, 30*a* that extends through the floor 6 is preferably tubular or trough-shaped, and the new hoisting roping 4 passes at least partly inside the aforementioned tubular or trough-shaped part.

Figure 6:
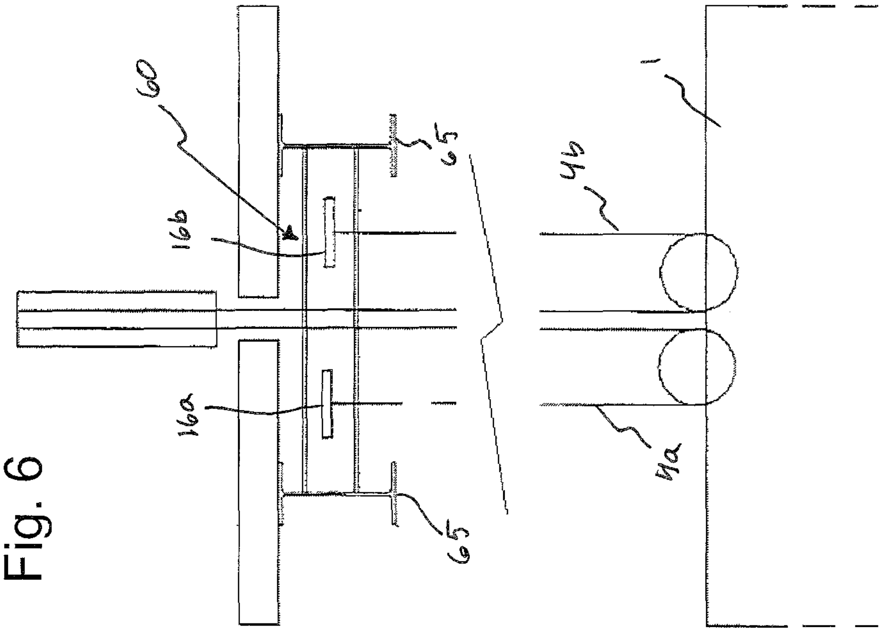
FIG. 6 presents a preferred method to arrange the elevator according to FIG. 2 according to a third embodiment.

FIG. 6 presents a third preferred method for arranging the rope clamps 16*a* and 16*b* to be supported on the same support element. In this case in the method the support element 60, on which the rope clamps 16*a* and 16*b* are already supported, is installed in the top part of the elevator hoistway. The support element 60 is a horizontal beam that is below the floor of the machine room. The support element 60 is supported in the method preferably on the horizontal beams 65 of the old elevator that are below the floor 6 of the machine room 5. The floor 6 refers to the load-bearing machine room slab presented in the figures, the top surface of which faces the machine room and the bottom side of which faces the elevator hoistway.

Figure 7:
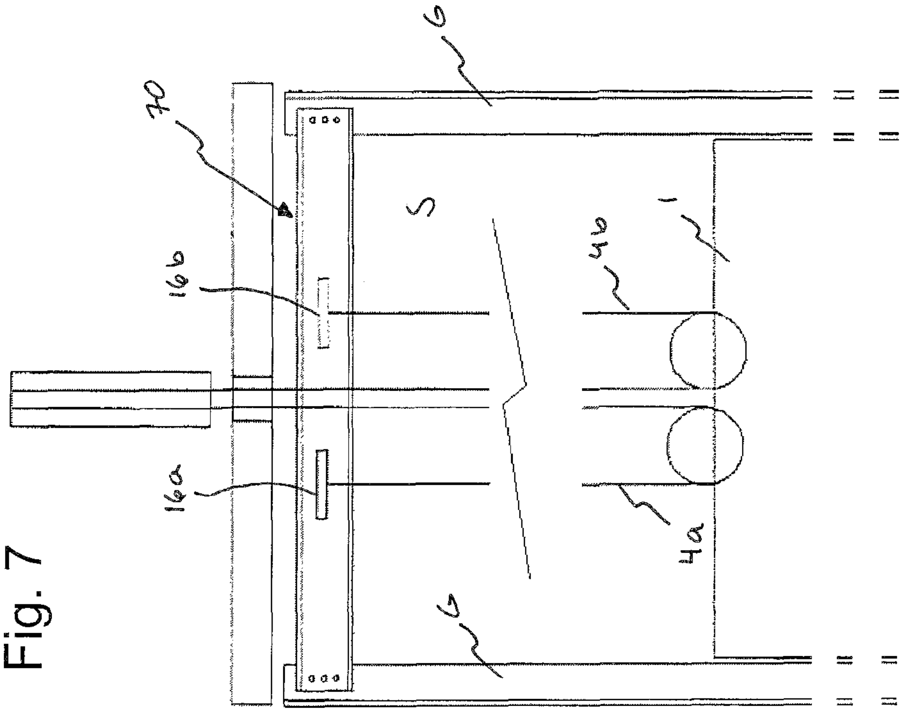
FIG. 7 presents a preferred method to arrange the elevator according to FIG. 2 according to a fourth embodiment.

FIG. 7 presents a fourth preferred method for arranging the rope clamps 16*a* and 16*b* to be supported on the same support element. In this case in the method the support element 70, on which the rope clamps 16*a* and 16*b* are already supported, is installed in the top part of the elevator hoistway. The support element 70 is a horizontal beam 70 that is below the floor 6 of the machine room, which beam is in the method fixed at its ends to the guide rails of the elevator car. If the solution is used for fixing the rope sections on the counterweight side, the horizontal beam is correspondingly supported on the guide rails of the counterweight. The diverting pulleys presented in this solution, as in the solution of FIG. 6, can be at an angle with respect to each other, to achieve bypassing of the horizontal beam. The shafts are in this case most preferably horizontal, but at an angle of 10-90 degrees to each other when viewed from above. On the other hand, the bypassing of the beam can be done by shaping the beam so that in all the embodiments the diverting pulleys can be implemented e.g. as parallel diverting pulleys with horizontal shafts.

In general the invention can be said to be such that the rope clamps (16*a*, 16*b* and/or 17, 17*b*) are in their entirety below the floor 6 of the machine room 5 and there is no aperture in the floor 6 at the point of said clamps. In the method the hoisting machine is changed to be preferably gearless, i.e. the machine is changed into one in which the speed of rotation (rpm) of the motor corresponds to the speed of rotation (rpm) of the traction sheave. In this case the motor is preferably replaced for a new one and the machine is arranged to be such that the motor is coaxial with the traction sheave. Replacement of the traction sheave is not necessary, but in the method preferably also the traction sheave 8 is renewed. The presence of a diverting pulley is also not generally necessary, and in the method it can be replaced or not replaced.

The embodiments presented can be used in connection with each other in any combination whatsoever. The rope clamps on the elevator car side can be fixed e.g. according to FIG. 4 and the ones (17*a*,17*b*) on the counterweight side according to FIG. 5, or vice versa. Alternatively, the rope clamps on the elevator car side can be fixed e.g. according to FIG. 6 and the ones (17*a*,17*b*) on the counterweight side according to FIG. 7, or vice versa. The solution according to FIG. 4 can, of course, be used in connection with the solution of FIG. 6 or 7, and the solution according to FIG. 5 can, of course, be used in connection with the solution of FIG. 6 or 7. Of course, the rope clamps (16*a*,16*b*,17*a*,17*b*) on both sides can be fixed according to FIG. 4, 5, 6 or 7. With different combinations, manifest space-effective advantages as well as advantages related to the convenience of the location from which to take support force can be achieved. It is obvious that, if necessary, the rope fixing on only one side, either the counterweight side or the elevator car side, can be according to those presented in FIGS. 4-7, and the rope fixing on the other side can be some other type, e.g. a direct fixing to an old beam of the elevator hoistway or even a lead-in into the machine room by means of holes or, for instance, according to FIG. 8.

The aforementioned rope clamps (16*a*,16*b*,17*a*,17*b*) are supported when the new elevator is completed directly on their shared support element, to which they are preferably fixed rigidly into their position. They can be either fixed to the support element separately or they are originally at least partly an inseparable part of it. The ropes passing from the diverting pulleys (12*a*,12*b* and/or 13*a*,13*b*) to their fixing points and/or to the traction sheave ascend from the aforementioned diverting pulleys preferably directly upwards. The ropes are fixed to the rope clamps such that the ends of them are in the elevator hoistway and such that the part of the ropes arriving at a rope clamp that are subjected to tension is in the elevator hoistway. The rope clamps (16*a*,16*b* and/or 17*a*,17*b*) that are supported on the aforementioned support element (20,30,60,70) that is supported in its position are at a horizontal distance from each other, which horizontal distance is essentially greater than the width of the rope mat to be lowered from the traction sheave. Likewise the horizontal distance is greater than the width of the aforementioned aperture in the direction of the aforementioned horizontal distance.

The rope clamps (16*a*,16*b* and/or 17*a*,17*b*) can be in connection with the support element (20,30,60,70), when the support element (20,30,60,70) is installed into position in the elevator hoistway (S). In this way the working in the elevator hoistway and the positioning work are reduced. Alternatively, fixing locations for the rope clamps (16*a*,16*b* or 17*a*,17*b*) are made in the support element (20,30,60,70) before it is installed into its position, into which fixing locations the rope clamps are fixed after installation of the support element (20,30,60,70) into its position, of which fixing locations the support element preferably comprises a plurality per each rope clamp, and preferably the distance between rope clamps is adjusted to be suitable (from the viewpoint of the position of the ropes supported by them), after which the rope clamps (16*a*,16*b* or 17*a*,17*b*) are fixed into the fixing location that is at its point to be supported by the support element in question. In other words, fixing locations to be used are chosen so that a suitable distance between the clamps is achieved. Thus working and the positioning of the rope clamps is simple, fast and can be done accurately. Each aforementioned rope clamp (16*a*,16*b*,17*a*,17*b*) can comprise a fixing location for one or more ropes.

Figure 8:
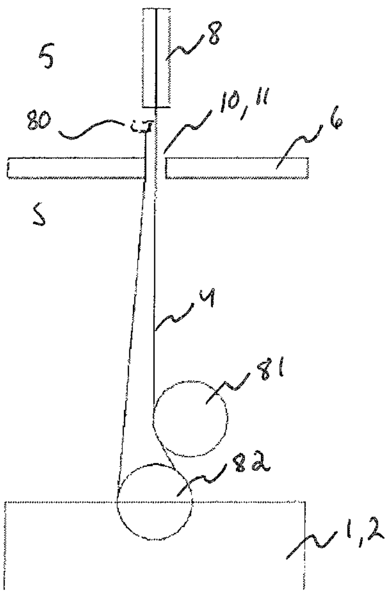
FIG. 8 presents one alternative method to arrange the suspension of the elevator car and/or of the counterweight of the new elevator.
Figure 9A:
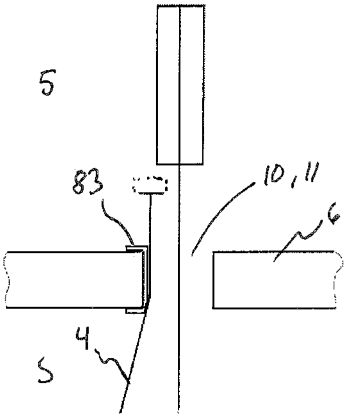
FIG. 9*a* presents a preferred method to guide the roping of the solution of FIG. 8.
Figure 9B:
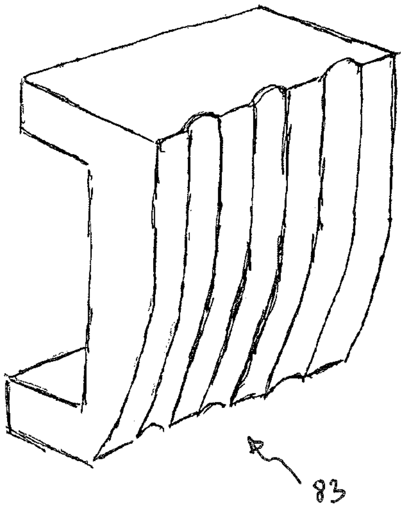
FIG. 9*b* presents the protection and/or guide means of the roping of FIG. 9*a*.

FIG. 8 presents yet another alternative method for the suspension of the elevator car 1 and/or the counterweight 2 in the modernization of the old elevator of FIG. 1, with which method at least some of the same advantages as those presented with the preceding embodiments are achieved. In this solution in the method a suspension diverting pulley 81 and a deflector diverting pulley 82 are installed in connection with the elevator car and above it. The new roping is guided to pass from between the suspension diverting pulley 81 and the deflector diverting pulley 82 and below the suspension diverting pulley 81 upwards to the rope clamp. The rope clamp is preferably in the machine room 5. The rope clamp in this case preferably takes vertical support force from the machinery bedplate (not shown in figure), which supports the traction sheave 8, or from the top surface of the floor 6 of the machine room or from some other structure supported on the top surface of the floor. The new rope passes into the machine room preferably via essentially the same aperture 10 via which the old rope 3 passed to the elevator car 1. The deflector diverting pulley 81 is higher than the suspension diverting pulley and partly overhanging it. The roping 4 is guided to pass from the traction sheave 8 to the suspension diverting pulley 82 such that it tangentially touches the deflector diverting pulley 81, which forms an angle between the rope coming to it and the rope leaving it towards the suspension diverting pulley. Thus it forces the section of roping 4 that descends from the traction sheave 8 and the section of roping 4 that passes from the suspension diverting pulley 82 to the fixing point to pass close to each other. Thus they both fit via the aperture 10. The aperture 10 is thus essentially the same aperture as the aperture via which the old roping passed. The aperture 10 of the floor 6 can be provided with a rope guide and/or rope protection means 83. The means 83 can guide the section of roping 4 rising to the rope clamp 80 from the suspension diverting pulley 82 to form an angle at the point of said means, in which case it fits through the aperture 10 more easily. The means 83 can be manufactured from metal, polymer, composite, or it can be ceramic. It comprises a curved surface that comes against the rope. The aforementioned curved surface is preferably a part of a rope groove comprised in the means 83, which part keeps the rope in its position in the lateral direction. There is preferably at least the same amount of the aforementioned rope grooves as the amount of ropes in the roping 4. The rope grooves are preferably at a horizontal distance from each other for keeping ropes that are side-by-side at a distance from each other. FIG. 9*b* presents the means 83. The means preferably comprises a curved section and a straight section, in which case the curved section can guide the rope coming to it to curve towards a vertical position. The solution according to FIGS. 8-9*b* can correspondingly be used on the counterweight side, in which case the aforementioned old aperture is the aperture 11 in FIG. 1.

It is obvious to the person skilled in the art that the invention is not limited to the embodiments described above, in which the invention is described using examples, but that many adaptations and different embodiments of the invention are possible within the frameworks of the inventive concept defined by the claims presented below. It is, for example, obvious that the rope clamps do not necessarily need to be installed in the top part of the hoistway S before the removal of the old hoisting roping, but instead they can be installed only essentially simultaneously with the installation phase of the new rope.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for modernizing an elevator, wherein the suspension of an old elevator is modified, the old elevator comprising:

an elevator car;

a counterweight;

an elevator hoistway;

a hoisting machine with a traction sheave in a machine room above the elevator hoistway, for moving the elevator car in the elevator hoistway via the hoisting roping;

old hoisting roping comprising one or more hoisting ropes, the old hoisting roping passing around the traction sheave and connecting the elevator car and the counterweight, and passing from the traction sheave to the elevator car or the counterweight, and to a rope clamp that is in connection with the elevator car or the counterweight, via an aperture in the floor of the machine room, said method comprising the steps of:

arranging a first rope clamp and a second rope clamp in a top part of the elevator hoistway such that the first rope clamp and the second rope clamp are supported by a same support element supported in its position;

removing the old hoisting roping; and installing a new hoisting roping by guiding the new hoisting roping to pass around the traction sheave and to connect the elevator car and the counterweight, and guiding the new hoisting roping to pass from the traction sheave to the elevator car or the counterweight via the aperture in the floor of the machine room, the new hoisting roping comprising a plurality of ropes, including:

a first part that is guided to pass to the elevator car or the counterweight to a first diverting pulley that is in connection with the elevator car or the counterweight, and onwards from the first diverting pulley back upwards to the first rope clamp in the top part of the elevator hoistway; and a second part that is guided to pass to the elevator car or the counterweight to a second diverting pulley that is in connection with the elevator car or the counterweight, and onwards from the second diverting pulley back upwards to the second rope clamp in the top part of the elevator hoistway.

2. The method according to claim 1, wherein the number of ropes of the first part of the hoisting roping that are side-by-side on the first diverting pulley is essentially as great as the number of ropes of the second part of the hoisting roping that are side-by-side on the second diverting pulley, and the combined number of ropes of the rope parts is the same as the number of hoisting ropes of the hoisting roping that are side-by-side on the traction sheave.

3. The method according to claim 1, wherein the first part and the second part arriving at the first and second diverting pulleys from the traction sheave are at a first distance from each other, and the first part is guided when the first part passes under the first diverting pulley to bend in a first direction and the second part is guided when the second part passes under the second diverting pulley to bend in a second direction such that the first part and the second part that leave the first and second diverting pulleys upwards are at a second distance from each other that is essentially greater than the first distance.

4. The method according to claim 1, wherein the new hoisting roping is guided to pass from the traction sheave to the elevator car or the counterweight via the aperture in the floor of the machine room, and the aperture is at least essentially the same aperture via which the old hoisting roping passed from the traction sheave to the elevator car or the counterweight.

5. The method according to claim 1, wherein the first and the second rope clamps in the top part of the elevator hoistway are arranged to take vertical support force from the top surface of the floor of the machine room or from the structure that is on top of the floor by means of said same support element that extends through the floor.

6. The method according to claim 5, wherein said same support element is fixed to said structure that is on top of the floor.

7. The method according to claim 5, wherein said same support element extends onto the top surface of the floor or of the said structure that is on top of the floor, from where said same support element takes vertical support force.

8. The method according to claim 5, wherein said structure on top of the floor is a bedplate.

9. The method according to claim 1, further comprising the step of installing said same support element into its position.

10. The method according to claim 1, further comprising the step of installing the first and second diverting pulleys in connection with the elevator car and counterweight.

11. The method according to claim 1, further comprising the step of fixing the first and second rope clamps in said same support element.

12. The method according to claim 1, wherein said same support element extends through the floor via the same aperture via which the new hoisting roping passes to the elevator car or counterweight.

13. The method according to claim 1, wherein the first and second rope clamps are in their entirety below the floor of the machine room and there is no aperture in the floor at the point of the first and second rope clamps.

14. The method according to claim 1, wherein the first and second rope clamps that are supported on said same support element that is supported in its position are at a horizontal distance from each other, the horizontal distance being greater than a width of the aperture in the direction of the horizontal distance.

15. The method according to claim 1, wherein the first and second rope clamps that are supported on said same support element that is supported in its position are at a horizontal distance from each other, the horizontal distance being essentially greater than a width of a rope mat to be lowered from the traction sheave.

16. The method according to claim 1, wherein said same support element comprises a part that extends through the floor from the elevator hoistway, and on the elevator hoistway side, a first part of said part that protrudes to a first side, on which the first rope clamp is disposed, and a second part of said part that protrudes to a second side, on which the second rope clamp is disposed, such that the first and the second rope clamps are at a horizontal distance from each other.

17. The method according to claim 1, wherein said same support element comprises a part that extends through the floor from the elevator hoistway, and on the machine room side, first parts of said part that protrude to a first side and to a second side, said first parts extending over the top surface of the floor or of a structure supported against the floor.

18. The method according to claim 1, wherein said same support element comprises a part that extends through the floor from the elevator hoistway, the part being tubular or trough-shaped, and the new hoisting roping passes at least partly inside the tubular or trough-shaped part.

19. The method according to claim 1, wherein said same support element is a horizontal beam that is below the floor of the machine room.

20. The method according to claim 1, wherein the first and second rope clamps are in connection with said same support element when said same support element is installed into position in the elevator hoistway.

21. The method according to claim 1, further comprising the steps of:

making fixing locations for the first and second rope clamps in said same support element before said same support element is installed into its position;

fixing the first and second rope clamps into the fixing locations after installation of said same support element into position, of which fixing locations said same support element comprises a plurality per each of the first and second rope clamps;

adjusting a distance between the first and second rope clamps to be suitable; and after said step of adjusting, fixing the first and second rope clamps into the fixing locations at their points.

22. The method according to claim 1, wherein the first and second rope clamps comprise a fixing location for one or more ropes.

23. The method according to claim 1, wherein said same support element is supported on horizontal beams of the old elevator that are below the floor of the machine room.

24. The method according to claim 1, wherein said same support element is a horizontal beam that is below the floor of the machine room, the beam being fixed at ends thereof to guide rails of the elevator car.

25. The method according to claim 1, wherein shafts of the first and second diverting pulleys are horizontal and at an angle to each other.

26. The method according to claim 1, wherein shafts of the first and second diverting pulleys are horizontal and parallel.

27. The method according to claim 1, wherein the new hoisting roping is guided to pass from the traction sheave to the elevator car or to the counterweight without forming new apertures in the floor for the new hoisting roping.

* * * * *